No. 614,935. Patented Nov. 29, 1898.
J. B. CONDE.
MACHINE FOR NECKING AND LIPPING VIALS, &c.
(Application filed Feb. 24, 1897.)

(No Model.) 6 Sheets—Sheet 1.

Witnesses. Inventor.

No. 614,935. Patented Nov. 29, 1898.
J. B. CONDE.
MACHINE FOR NECKING AND LIPPING VIALS, &c.
(Application filed Feb. 24, 1897.)
(No Model.) 6 Sheets—Sheet 5.

Witnesses. Inventor.
A. V. Groupe James B. Conde
H. L. Cheeseman per John R. Nolan
Attorney.

No. 614,935. Patented Nov. 29, 1898.
J. B. CONDE.
MACHINE FOR NECKING AND LIPPING VIALS, &c.
(Application filed Feb. 24, 1897.)
(No Model.) 6 Sheets—Sheet 6.
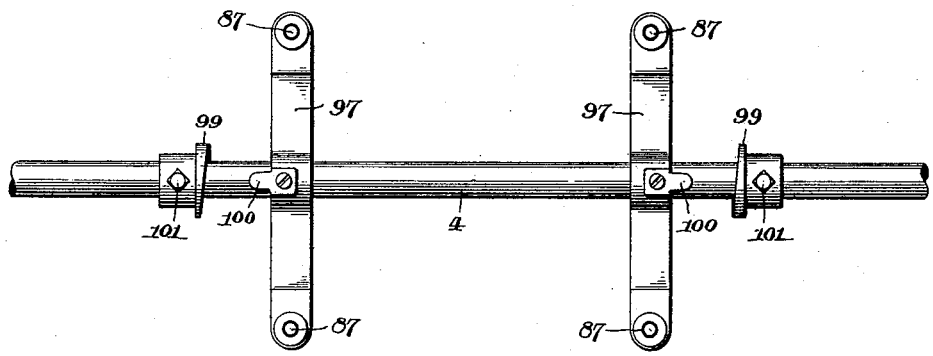
Fig. 8.
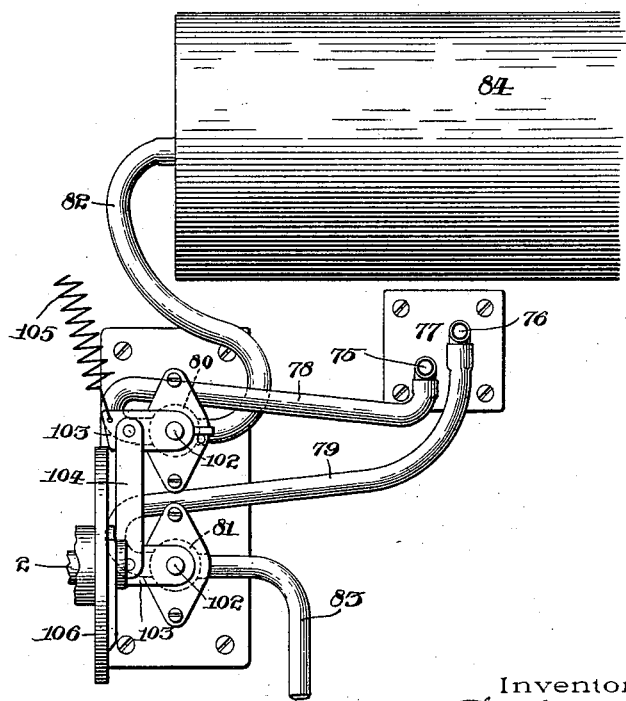
Fig. 10.
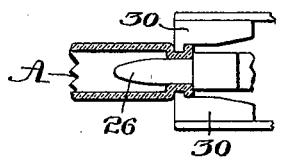
Fig. 9.
Fig. 11.
Witnesses.
A. V. Groupe
H. L. Cheeseman
Inventor.
James B. Conde
per John R. Nolan
Attorney.

UNITED STATES PATENT OFFICE.

JAMES B. CONDE, OF CLIFTON HEIGHTS, PENNSYLVANIA.

MACHINE FOR NECKING AND LIPPING VIALS, &c.

SPECIFICATION forming part of Letters Patent No. 614,935, dated November 29, 1898.

Application filed February 24, 1897. Serial No. 624,882. (No model.)

*To all whom it may concern:*

Be it known that I, JAMES B. CONDE, a subject of the Queen of Great Britain and Ireland, (but having declared my intention to become a citizen of the United States,) residing at Clifton Heights, in the county of Delaware and State of Pennsylvania, have invented certain new and useful Improvements in Machines for Necking and Lipping Vials, &c., of which the following is a full, clear, and exact description, reference being had to the accompanying drawings, forming a part of this specification.

This invention relates to machines for necking and lipping vials and other bottles, my object herein being to provide a construction wherein the successive operations of rotating and heating the glass, applying the central plugs thereto, and operating the dies in respect to the heated glass shall be automatically performed in an efficient and expeditious manner.

To this end the present invention comprehends various novel features of construction and organization of parts, which will be hereinafter described and claimed.

Figure 1:
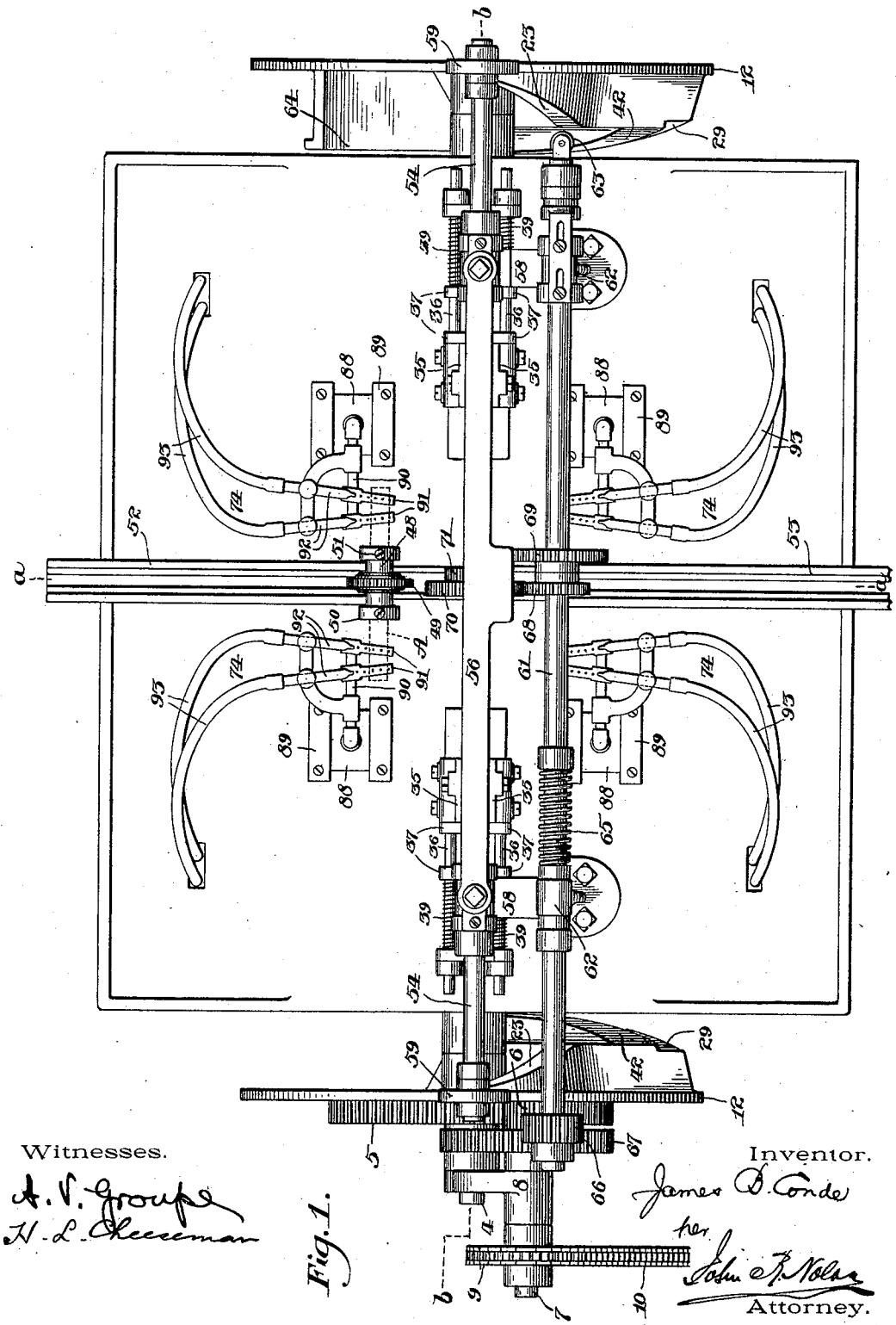
Figure 2:
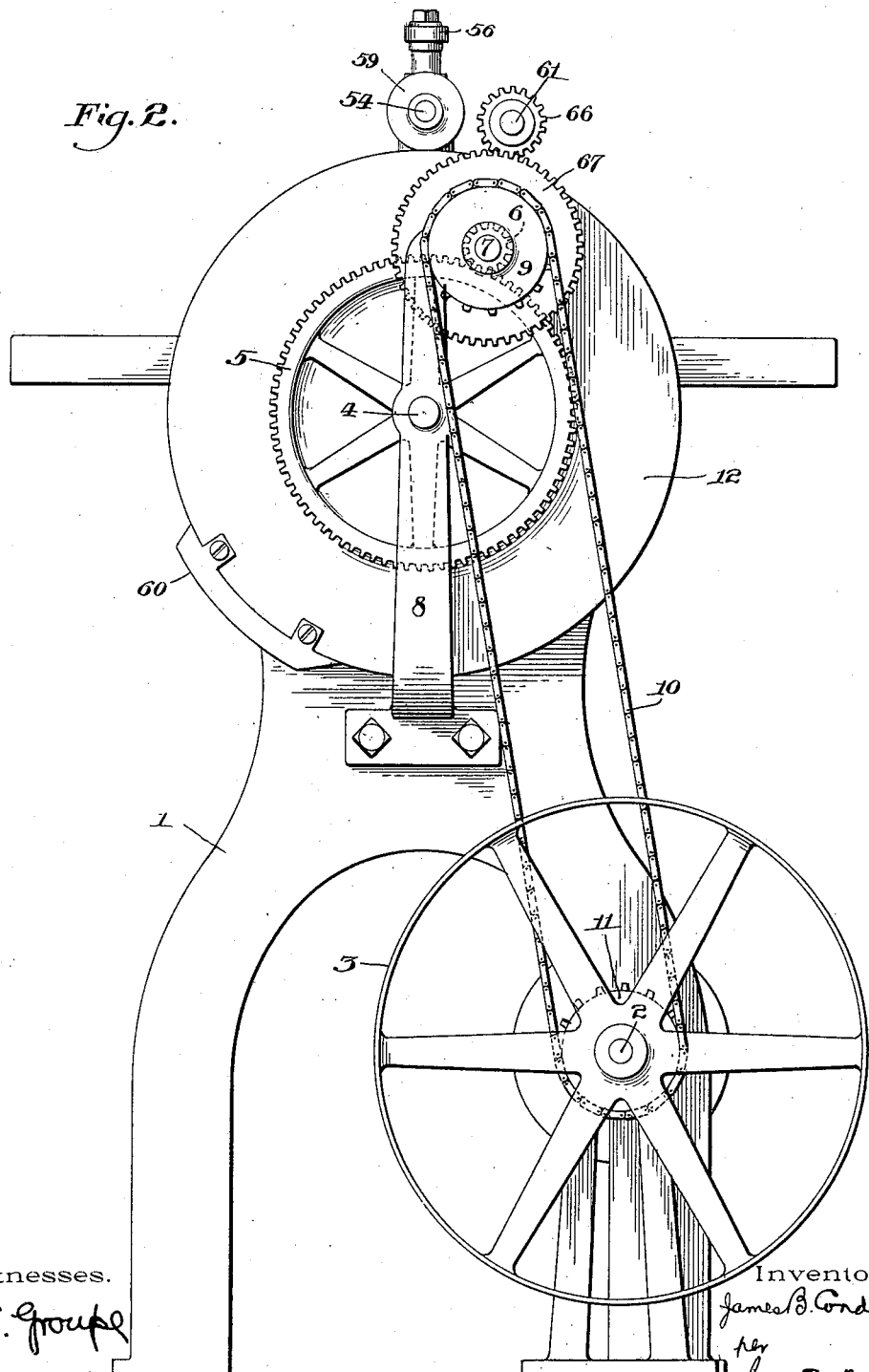
Figure 3:
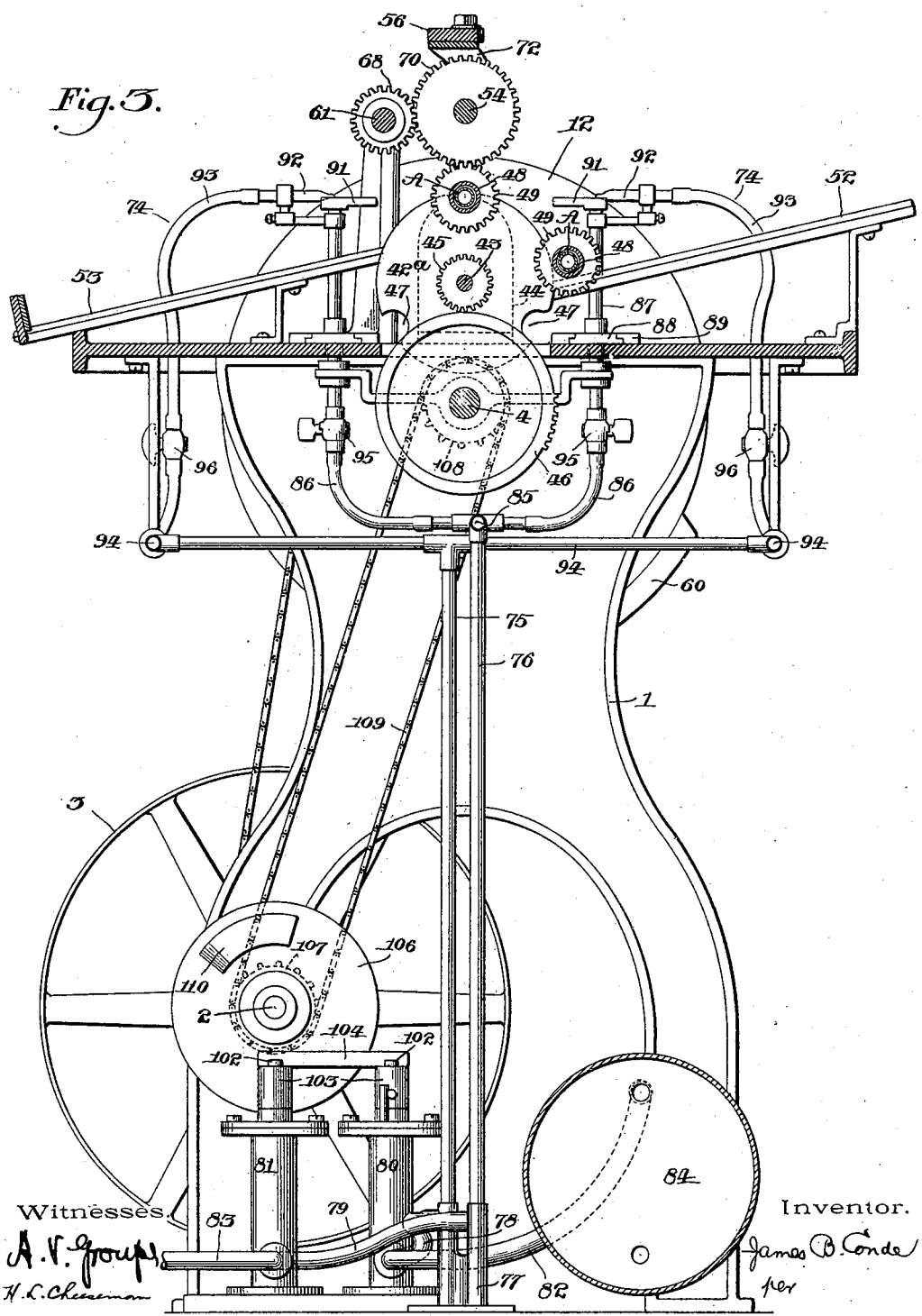
Figure 4:
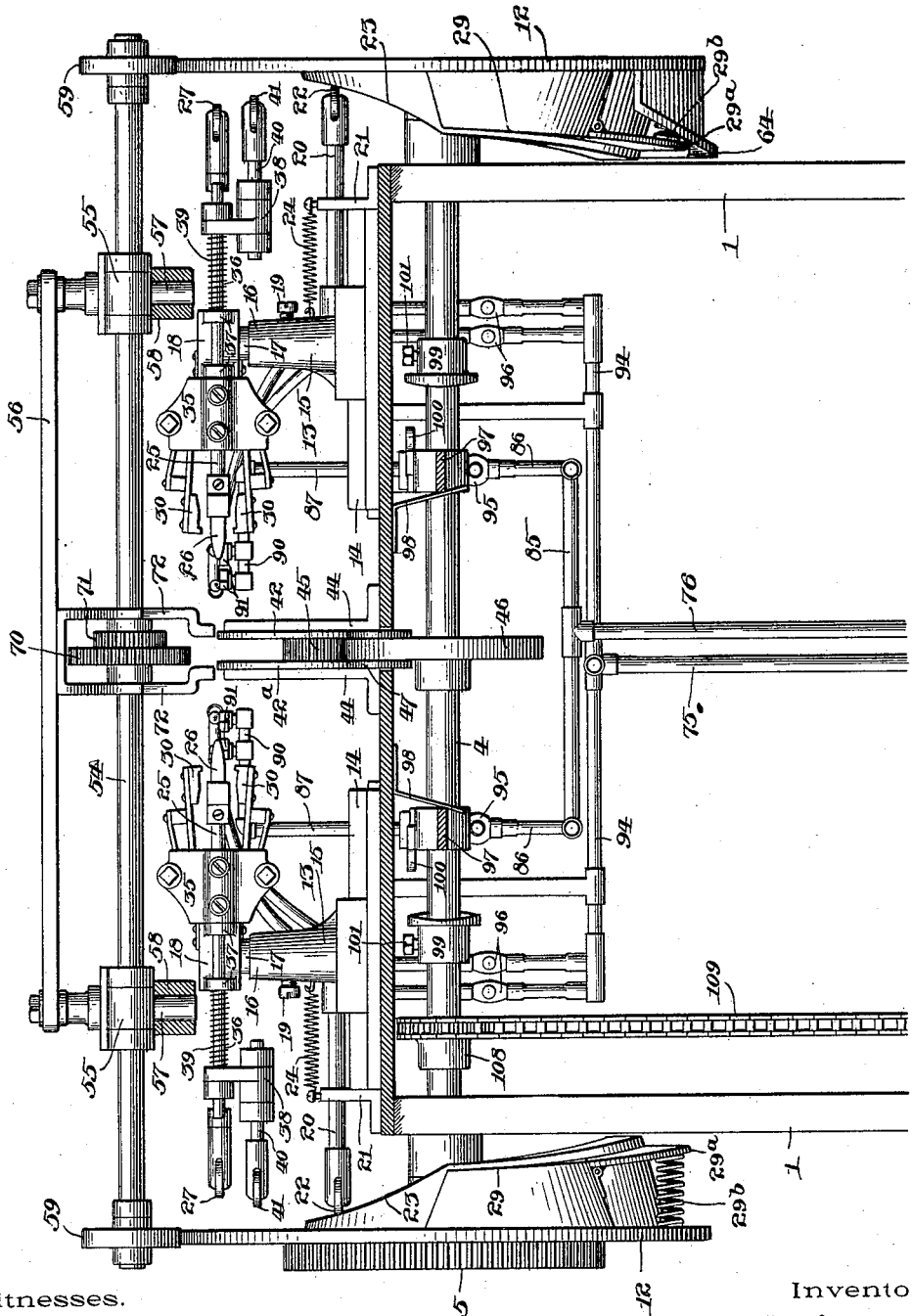
Figure 5:
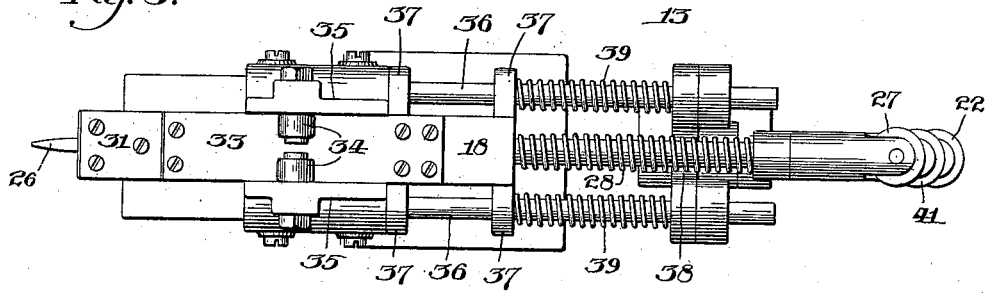
Figure 6:
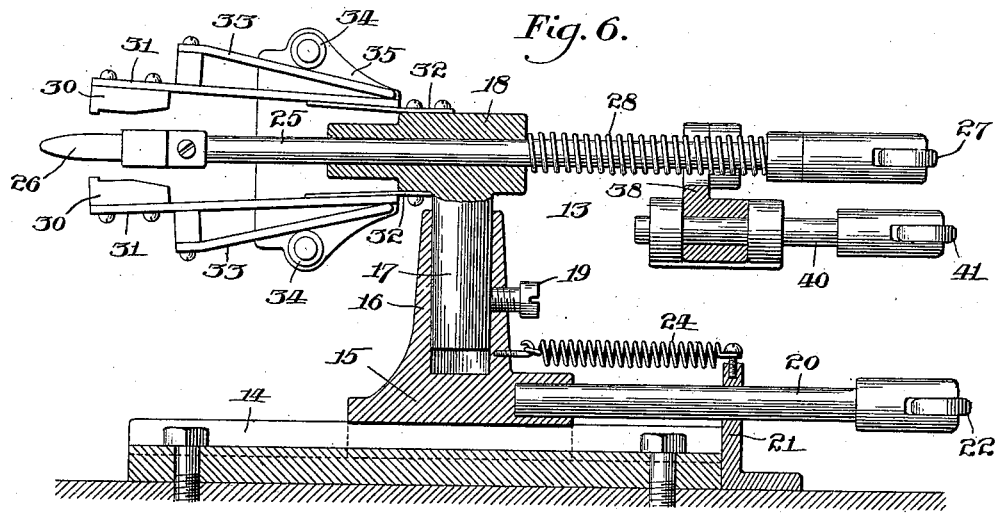
Figure 7:
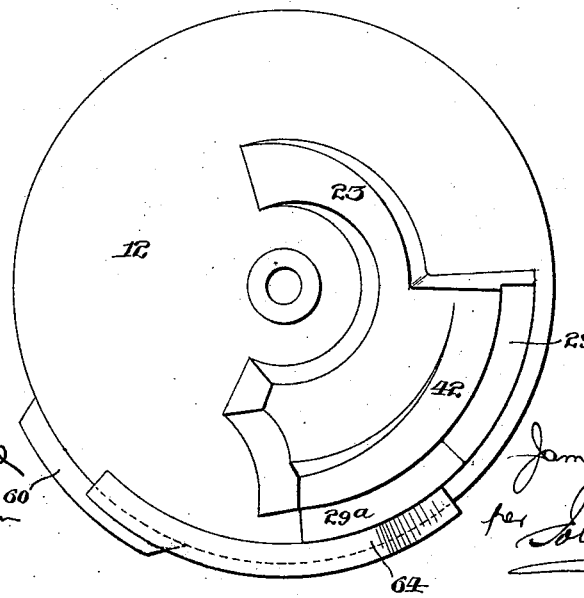

In the drawings, Figure 1 is a plan of a machine embodying my improvements. Fig. 2 is an end view thereof. Fig. 3 is a transverse vertical section as on the line $a\ a$ of Fig. 1. Fig. 4 is a longitudinal vertical section as on the line $b\ b$ of Fig. 1. Fig. 5 is a plan of one of the plug and die supporting carriages. Fig. 6 is a vertical section thereof. Fig. 7 is a face view of one of the governor-wheels. Fig. 8 is a detail of the counter-shaft and means for reciprocating the heating devices. Fig. 9 is a detail of the feed-wheel and one of the bearing-arms for the glass-holding sleeve. Fig. 10 is a plan of the valve mechanism and connections for controlling the air and gas supply. Fig. 11 is a detail of the dies as closed upon the end of the heated glass tube.

The numeral 1 designates a substantial supporting-frame on which the various working parts of the machine are mounted. 2 is the main shaft, provided with a fixed pulley 3, which is driven from a suitable source of power, and 4 is a counter-shaft geared with the main shaft and driven thereby at a reduced rate of speed. In the present instance the gearing comprises a spur-wheel 5 on the end of the counter-shaft, a coacting pinion 6, mounted on a stud-shaft 7, journaled in a bracket 8 on the end of the main frame, a sprocket-wheel 9 on said latter shaft, and a sprocket-chain 10, connecting said sprocket-wheel with a similar wheel 11 on the main shaft.

12 12 are "governor-wheels," as they may be termed, fixed on the respective ends of the counter-shaft, and 13 13 are oppositely-disposed plug and die supporting carriages, which, together with their respective plugs and dies, are appropriately actuated by said wheels. These carriages, which are duplicates in all respects, excepting that one is right and the other left handed, are fitted to longitudinal guideways 14 on the main frame, so as to be movable toward and from each other. Each of the carriages comprises a base 15, from which rises a tubular projection 16 for the reception of a depending shank 17 of a horizontal head-piece 18. In the side of the projection is a set-screw 19 or the like, by means of which the shank and perforce the head-piece may be set in predetermined positions of vertical adjustment. Fixed to the base of the carriage is a rod 20, which extends through a guide-bracket 21 on the main frame and carries on its free extremity an antifriction-roller 22, that bears against the opposing face of the governor-wheel, whereby during the rotation of the latter the carriage is advanced or retracted as the cam 23 on the face of the wheel may dictate. To the carriage and the bracket are secured the respective ends of a retracting-spring 24, the tendency of which is to retract the carriage, and thus maintain the rod in engagement with the governor-wheel.

Guided in the head-piece is a horizontally-reciprocative rod 25, on the inner end of which is provided a shouldered plug 26, preferably detachable, and on the outer end an antifriction-roller 27, which is held normally in contact with the governor-wheel by the action of a spiral spring 28, which, encircling the rod, bears against one end of the head-piece and against a collar on the outer end of the rod. The governor-wheel is provided with an appropriate rise or cam-surface 29, which coacts with the roller 27 at predetermined intervals to effect the requisite reciprocations of the rod and its plug. This plug extends between two opposing dies 30 30, which are adapted to be moved simultaneously toward or away from the plug. The dies are secured to the outer ends of diverging jaws or bars 31, the inner ends of which are affixed to flat springs 32 on the head-piece. The tendency of the springs is to maintain the dies normally open or separated. Formed on or secured to the outer faces of the respective jaws 31 are oppositely-inclined strips 33, which normally lie adjacent to or against opposing rollers 34 on laterally-disposed slides 35, whereby when said slides are moved inward the rollers, bearing upon the inclines, forcibly close the jaws and dies, and when, on the other hand, the slides are retracted the jaws and dies automatically resume their normal or open position. The slides are provided with outwardly-extending rods 36, which are guided in lugs 37 on the head-piece. The outer ends of the rods are connected by a cross-piece 38 and are equipped with springs 39, that, encircling the rods, bear against the opposing lugs and the cross-piece, so as to maintain the rods and their slides normally retracted. Extending from the cross-piece is a stud 40, carrying an antifriction-roller 41, that bears against the governor-wheel, the latter being provided with an appropriate cam 42, which at predetermined intervals engages the roller and effects the advancement of the slides against the action of the springs.

Mounted on the main frame midway between the two carriages 13 13 is an intermittently-rotatable feed-wheel 42ª, in which are adapted to be supported and rotated the glass sections A, (see dotted lines in Fig. 1,) from which the vials or bottles are to be made. These sections are delivered successively to the wheel and are carried thereby singly to a position intermediate the opposing plugs, whereby when the plugs are moved inward through the medium of the respective governor-wheels the plugs simultaneously enter the respective ends of the section.

The feed-wheel in its preferred form comprises two disks 42ª, affixed a suitable distance apart to a shaft 43, which is journaled in and between suitably-located brackets 44 on the main frame. On this shaft intermediate the disks is secured a pinion 45, with which are adapted to coact at predetermined intervals the teeth of a mutilated gear or sector 46, fast on the counter-shaft 4, above referred to. The teeth of the gear 46 are so disposed that during a partial revolution of the gear the pinion is turned thereby one-third of a revolution, thereupon remaining quiescent until the gear reëngages the pinion for a corresponding action. The peripheries of the disks 42ª are provided with a series of equidistant semicircular recesses 47, which constitute bearings for sleeves 48, in which the glass sections A are held, to the end that the sleeves may be bodily turned by and with the disks and also be independently rotated when the feed-wheel is at rest.

The sleeves just mentioned are similar in construction to those set out in my previous application, or substantially so, being each provided midway of its ends with a pinion 49 and at or near its ends with collars or flanges 50, bearing radial set-screws 51, whereby the glass section is or may be firmly clamped in place. The sleeves, with the sections thus held therein, are assembled in line upon an inclined trackway 52, which leads to the feed-wheel, to the end that the sleeves will gravitate toward the wheel. Hence during the partial rotation of the feed-wheel the opposite recesses on the respective disks will turn in proximity to the leading sleeve on the trackway, which sleeve will thereupon roll into said recesses, and in consequence be carried upward by the wheel. When the sleeve has been brought directly intermediate the plugs, the mutilated gear 46 will escape the pinion 45, and the motion of the feed-wheel will therefore be arrested until the gear 46 reëngages the pinion for a succeeding operation. Meanwhile the said sleeve will be positively rotated, the shouldered plugs will be advanced into and against the ends of the section, heat will be applied to said ends, and the dies will be closed thereon to form necks and lips on the respective ends of the section. This done, the sleeve will be released and the dies, plugs, and heating devices will resume their normal condition, whereupon in the succeeding movement of the feed-wheel the sleeve, with the necked and lipped tube therein, will be discharged onto a rearward offbearing-trackway 53 and another sleeve will have been taken from the trackway 52 and carried into position intermediate the plugs.

As a simple and efficient means whereby the sleeve intermediate the plugs may be rotated at different speeds at predetermined stages in order to meet the requirements of the neck and lip forming operation I have devised mechanism of the following character, although it may be here remarked that other means to the same end may be employed without departing from my invention.

54 designates a horizontal shaft extending directly above the feed-wheel. This shaft is journaled near its respective ends in vertically-movable bearing-blocks 55, which are connected by a longitudinal bar 56 and are provided with depending guide-studs 57, that are fitted to guide-brackets 58, respectively, rising from the main frame. On the ends of the shaft 54 are rollers 59, which run upon the peripheries of the respective governor-wheels, said wheels being each provided at a part of its periphery with a projection 60, which is adapted during the rotation of the wheel to coact with the opposing roller and thereby bodily raise the shaft. Rearwardly of this shaft is a parallel shaft 61, which is mounted in bearings 62 in the brackets 58. This shaft is longitudinally movable as well as rotatable in its bearings, and it is provided on one end with an antifriction-roller 63, that is held normally in the path of a cam 64 on one of the governor-wheels by the action of a spiral spring 65, which, encircling the shaft, bears against a collar thereon and against one of the brackets 58. Consequently during the rotation of the governor-wheel the shaft is moved longitudinally at prescribed stages. On the opposite end of this shaft is fixed a pinion 66, which gears with and is driven by a spur-wheel 67 on the stud-shaft 7, above referred to. On or about the middle of the shaft 61 are affixed two gear-wheels 68 69, one of which is larger than the other, while on the adjacent shaft 54 are affixed a pair of corresponding different-sized gear-wheels 70 71, which are so arranged that when the shaft 61 is moved longitudinally in one direction the gear 68 thereon coacts with the larger wheel 70 on the shaft 54 and, perforce, rotates the latter; but when the shaft 61 is shifted in an opposite direction the larger gear 69 thereon engages the smaller wheel 71 on the shaft 54, and in consequence effects the rotation of the said latter shaft at an increased rate of speed.

When the sleeve is carried to the central position intermediate the plugs, as above stated, the shaft 54 is lowered by the action of the governor-wheels, so as to engage the gear 70 with the pinion 49 on the sleeve, and in consequence the sleeve with the glass-section is rotated at a high or low speed in accordance with the position of the shaft 61.

Depending from the bar 56, which connects the bearings for the shaft 54, are two arms 72, the lower extremities of which are provided with recesses 73, that are so disposed as to embrace the respective ends of the underlying sleeve when the said shaft is lowered, as described, thereby affording in connection with the corresponding recesses in the feed-wheel a substantial bearing for the sleeve. When the ends of the blank have been properly formed, the shaft 54 and therewith the arms are raised by the action of the governor-wheels, thus releasing the sleeve and permitting its transference by the feed-wheel to the offbearing-track.

The means herein employed for heating the ends of the centrally-supported glass section preparatory to the action of the dies thereon comprise suitably-arranged blowpipes 74, constructed and arranged to direct the flames against the respective ends of the section. There are two pairs of pipes directed toward the opposite sides of each end of the section, and hence both ends of the rotating section are uniformly heated.

Referring to Figs. 3 and 4, 75 76 indicate two vertically-disposed pipes affixed to a suitable base 77. These pipes are connected at their lower ends by means of tubes 78 79 with check-valves 80 81, respectively, which valves are in turn connected by pipes 82 83 with an air-reservoir 84 and with a source of gas-supply, respectively, whereby when the valves are opened air will flow into the pipe 75 and gas into the pipe 76. On the upper end of the gas-pipe 76 is a horizontal branch pipe 85, which is connected at its ends by means of flexible pipes 86 with four vertical pipes 87, that extend through and above slides 88, respectively, that are fitted to longitudinal guides 89 on the top of the main frame. These slides are so arranged that the pipes extend laterally of each end of the centrally-supported glass section, each of the pipes being provided at its upper extremity with a lateral branch 90, connected with a pair of perforated burners 91, that converge toward the end of the glass section. These burners are provided with blast-nipples 92, that are connected with flexible pipes 93, leading to a series of branch pipes 94 on the upper end of the vertical air-supply pipe 75. The pipes 87 and 93 are provided with suitable valves 95 96, respectively, whereby the flow of the fluids therein may be nicely regulated to insure an appropriate flame. The lower portions of each end pair of vertical pipes 87 are connected with a cross-bar 97, which is provided with a central boss slidingly fitted on the shaft 4, to the end that said pipes and their burner and nipple connections may be moved lengthwise of the machine in a manner to direct the flames along the end of the glass section if it be desired to form a long or extended neck on the latter. The cross-bars take normally against depending springs 98 (see Fig. 4) on the main frame, in which position the burners are designed to direct a steady fire on the ends of the section. In the formation of the usual neck the burners occupy the normal position; but if it be desired to heat a greater portion of the section for the action thereon of larger or longer dies appropriate face-cams 99 on the shaft 4 are moved up against laterally-projecting studs 100 on the cross-bars 97 and fixed in place by means of set-screws 101 or the like. Hence during the rotation of the shaft 4 the cams thereon bearing against the studs will move the cross-bars and their connections against the stress of the respective springs 98, thereby effecting the reciprocation of the burners and their adjuncts lengthwise of the glass section, as above mentioned.

As a simple and efficient means by which the flow of the gas and air to the burners may be automatically regulated at predetermined stages of the operation the keys or stems 102 of the valves 80 81 are provided with arms 103, that are connected by means of a link 104, and a retracting-spring 105 is secured to one of the arms and to the main frame, so as to maintain normally the air-valve shut and the gas-valve partially open. Mounted loosely on the main shaft, adjacent to these valves, is a face-cam 106, on the hub of which is a sprocket-wheel 107, that is connected with a similar wheel 108 on the shaft 4 by means of a chain 109, whereby said cam is driven at the same rate of speed as the counter-shaft. The projection 110 on the face of the cam is so disposed and the valves are so set that the projection at a predetermined interval strikes against the opposing end of one of the arms 103 and forces it forward against the stress of the spring in a manner to turn entirely on the gas and air. When the projection escapes the arm, the valves are returned by the spring to their normal position, in which the air is cut off and the flow of gas is reduced.

The general operation of the machine may be briefly described as follows: Sleeves 48, with the glass sections therein, are assembled on the trackway 52. The gas is turned on and lighted at the burners and power is applied to the main shaft, thereby actuating the counter-shaft and its connections. The feed-wheel 42$^a$ in its intermittent rotation receives the contiguous sleeve on the trackway and carries it upwardly to the central position intermediate the plugs. The shaft 54 and its connections are then lowered, the arms 72 engaging and supporting the sleeve and the pinion on said shaft engaging and actuating the gear 49 on the sleeve. At this stage the gear 68 on the shaft 61 is in gear with the wheel 70 on the shaft 54, in consequence of which the latter and perforce the underlying sleeve are rotated at a comparatively slow rate of speed. At the same time the air and gas are fully turned on, and the flames are thereby blown forcibly against the ends of the slowly-rotating glass section until such ends have been effectually heated. The plugs are then advanced into and against the respective ends of the rotating section. The shaft is then shifted to throw the high-speed gearing into action, and thus effect the rapid rotation of the section, at or about which time the slides are forced inward, so as to close the dies upon the ends of the section and effect the formation thereon of necks and lips. As the dies are closed the air-blast is checked, and the gas is partially turned off by the action of the cam-wheel.

When the necks and lips have been formed, the dies are opened and the plugs and carriages are retracted to their previous positions, whereupon the shaft 54 and its adjuncts are raised and the feed-wheel is turned a third of a revolution, so as to carry the sleeve and the glass section thus treated to the off-bearing trackway. During this movement of the wheel another sleeve and section are taken up thereby from the trackway 52 and carried to a position intermediate the plugs preparatory to a succeeding operation. In this way the holders and glass sections are successively taken up from the trackway 52, necked and lipped, and delivered to the offbearing-track, the several steps being entirely automatic.

It will be observed that the cams 29 on the respective governor-wheels for advancing the plug-carrying rods are provided with yielding extensions 29$^a$, comprising in this instance hinged plates held normally outward by suitably-disposed springs 29$^b$, whereby the shouldered portions of the respective plugs will be held yieldingly against the opposing ends of the glass section, and thus insure the formation thereon of uniform lips irrespective of irregularities in the glass.

I claim—

1. The combination, with means for supporting a glass section or tube, of a carriage adjacent thereto, means for reciprocating said carriage toward and from the end of the section or tube, a plug in said carriage, means for reciprocating said plug, dies on said carriage, and means for actuating said dies, substantially as described.

2. The combination, with means for supporting a glass section or tube, of a plug and die supporting carriage adjacent thereto, a governor-wheel adapted to actuate the carriage, its plug and the dies independently of each other, and means for operating said wheel, substantially as described.

3. The combination, with means for supporting a glass section or tube, of a normally-retracted carriage adjacent thereto, a horizontally-reciprocative rod in said carriage, a central plug on one end of said rod, a spring to maintain said rod normally retracted, normally open dies on said carriage, slides to close said dies, supporting-rods for said slides, means to maintain the rods normally retracted, and means for operating the carriage and the slide and plug supporting rods at predetermined intervals, substantially as described.

4. The combination, with means for supporting a glass section, &c., of a plug and die supporting carriage comprising a base, and a vertically-adjustable head-piece thereon, a guide for said carriage, and means for actuating the carriage, its plug and the dies, substantially as described.

5. The combination, with means for supporting a glass section, &c., of a plug, its supporting parts, means for forcing the plug inward and holding it inward under automatically-yielding pressure, the dies, and means for supporting and operating the same, substantially as described.

6. The combination, with means for supporting a glass section, &c., of a plug, its supporting parts, a governor-wheel provided with a spring-controlled cam portion adapted to actuate the plug, means for supporting and rotating said wheel, the dies, and means for supporting and operating the same, substantially as described.

7. The combination, with a section or tube holder, supporting differential-speed mechanism therefor, and means for rotating said holder at different rates of speed, of a plug, dies, means for supporting said plug and dies, and means for relatively operating the same, substantially as described.

8. The combination, with a hollow holder, a gear thereon, means for supporting said holder, differential-speed gearing therefor, and means for throwing said gearing into and out of operation, of the plug, the dies, and their supporting and operating parts, substantially as described.

9. The combination, with a hollow holder, a gear thereon, differential-speed gearing therefor, the plug and die supporting carriage, and a governor-wheel adapted to control said gearing, the carriage, and its plug and dies, substantially as described.

10. The combination, with the feed-wheel, a support therefor, means for intermittently rotating said wheel, hollow holders, means for delivering them to said feed-wheel in succession, means whereby glass sections are clamped in said holders, the dies, the plug, and their supporting and operating parts, substantially as described.

11. The combination, with a feed device, and its supporting and operating parts, of hollow holders, means for delivering them to said feed device, means for independently rotating said holders, arms adapted to embrace said holders, means for supporting said arms, and means for moving said arms toward and from the holders at predetermined intervals, substantially as described.

12. The combination, with a feed device, and its supporting and operating parts, of hollow holders, means for delivering them to said feed device, means for independently rotating said holders, arms adapted to embrace said holders, means for supporting said arms, and means for moving said arms toward and from the holders at predetermined intervals, together with the dies, the plug, and means for supporting and operating the same, substantially as described.

13. The combination, with a hollow holder, a gear thereon, and means for supporting said holder, of a shaft, a gear thereon adapted to coact with the first-named gear, vertically-movable bearings for said shaft, guide-brackets or supports for said bearings, means for rotating said shaft, and means for raising and lowering said shaft at predetermined intervals, substantially as described.

14. The combination, with a hollow holder, a gear thereon, and means for supporting said holder, of a shaft, a gear thereon adapted to coact with the first-named gear, vertically-movable bearings for said shaft, guide-brackets or supports for said bearings, means for rotating said shaft, governor-wheels adapted to raise and lower said shaft at predetermined intervals, and means for supporting and operating said wheels, substantially as described.

15. The combination, with a hollow holder, a gear thereon, and means for supporting said holder, of a shaft, two gears thereon, one of which is adapted to coact with the first-named gear, bearings for said shaft, a second shaft, a gear thereon, means for longitudinally moving said second shaft, and means for rotating the same, substantially as described.

16. The combination, with a hollow holder, a gear thereon, and means for supporting said holder, of a shaft, gearing thereon adapted to coact with the first-named gear, bearings for said shaft, a second shaft, gearing thereon, a spring to hold said second shaft in one position, a governor-wheel adapted to shift said latter shaft in opposition to the spring, means for supporting and operating said wheel, and means for driving said second shaft, substantially as described.

17. The combination, with a hollow holder, a gear thereon, and means for supporting said holder, of a shaft, gearing thereon adapted to coact with the holder-gear, rising and falling bearings for said shaft, supports for said bearings, and means for raising and lowering said shaft at predetermined intervals, together with the dies, the plug or plugs, the heating devices, and means for supporting and relatively operating the same, substantially as described.

18. The combination, with a hollow holder, and means for supporting the same, of a shaft, coacting gearing between the same and said holder, supports for said shaft, governor-wheels adapted to raise and lower said shaft at predetermined intervals, and means for supporting and operating said wheels, together with the dies, the plug or plugs, the heating devices, and means for supporting and relatively operating the same, substantially as described.

19. The combination, with a hollow holder, a gear thereon, and means for supporting said holder, of a shaft, two gears thereon, one of which is adapted to coact with the first-named gear, bearings for said shaft, a second shaft, a gear thereon, means for longitudinally moving said second shaft, and means for rotating the same, together with the dies, the plug or plugs, the heating devices and means for supporting and relatively operating the same, substantially as described.

20. The combination, with a hollow holder, a gear thereon, and means for supporting said holder, of a shaft, gearing thereon adapted to coact with the first-named gear, bearings for said shaft, a second shaft, gearing thereon, a spring to hold said second shaft in one position, a governor-wheel adapted to shift said latter shaft in opposition to the spring, means for supporting and operating said wheel, and means for driving said second shaft, together with the dies, the plug or plugs, the heating devices and means for supporting and relatively operating the same, substantially as described.

21. The combination, with the feed-wheel, and its supporting and operating parts, of a plug, dies, means for supporting said plug and dies, means for relatively operating the same, the heating devices, and automatic means for regulating the operation thereof at predetermined intervals, substantially as described.

22. The combination, with the feed-wheel, means for intermittently rotating the same, hollow holders, means for delivering them to said wheel, means for independently rotating said holders, a plug, dies, heating devices, and means for supporting and relatively operating said plug, dies and heating devices, substantially as described.

23. In an automatic machine for necking and lipping vials, &c., the combination, with a tube-support and a main driving-shaft, of tube-rotating mechanism, operative connections between said mechanism and the shaft, heating devices directed toward the end of the tube, a plug, dies, and their supporting parts, and operative connections between the same and the main shaft.

24. The combination, with means for supporting a glass section or tube, of a horizontally-reciprocative device adapted to act on the opposing end of said section or tube, means for supporting and guiding said device, means to maintain said device normally retracted, a governor-wheel to actuate said device, and means for rotating said wheel.

25. The combination, with means for supporting a glass section or tube, of a horizontally-reciprocative device adapted to act on the opposing end of said section or tube, means for supporting and guiding said device, means for maintaining said device normally retracted, a governor-wheel for actuating said device, means for rotating said wheel, mechanism for rotating said section or tube, and operative connections between said mechanism and the governor-wheel.

26. The combination, with the feed-wheel and its supporting and operating parts, of a horizontally-reciprocative device adapted to act on the opposing end of a section or tube, a governor-wheel adapted to actuate said device, means for rotating said wheel, heating devices, and automatic means for controlling the same.

In testimony whereof I have hereunto affixed my signature in the presence of two subscribing witnesses.

JAMES B. CONDE.

Witnesses:
ANDREW V. GROUPE,
JOHN R. NOLAN.